(12) United States Patent
Sanagi et al.

(10) Patent No.: US 7,669,896 B2
(45) Date of Patent: Mar. 2, 2010

(54) ANTI-INTRUSION PEDAL SYSTEM

(75) Inventors: Shuji Sanagi, Hiroshima (JP); Takeshi Terada, Hiroshima (JP)

(73) Assignee: Mazda Motor Corporation (JP)

( * ) Notice: Subject to any disclaimer, the term of this patent is extended or adjusted under 35 U.S.C. 154(b) by 725 days.

(21) Appl. No.: 11/500,972

(22) Filed: Aug. 9, 2006

(65) Prior Publication Data
US 2007/0137915 A1 Jun. 21, 2007

(30) Foreign Application Priority Data
Sep. 26, 2005 (JP) .............................. 2005-278431

(51) Int. Cl.
*B60R 21/05* (2006.01)
(52) U.S. Cl. ...................... 280/750; 180/274
(58) Field of Classification Search .................. 74/512, 74/560, 492, 493; 280/777, 748, 750, 779; 180/271, 274, 400, 407; 296/187.05
See application file for complete search history.

(56) References Cited

U.S. PATENT DOCUMENTS

| 4,577,716 | A * | 3/1986 | Norton ....................... 180/446 |
| 6,336,376 | B1  | 1/2002 | Lee |
| 7,370,722 | B2 * | 5/2008 | Noh .......................... 180/274 |
| 7,568,545 | B2 * | 8/2009 | Tanigawa et al. ............ 180/274 |
| 2003/0052481 | A1 | 3/2003 | Yang |
| 2005/0029794 | A1 * | 2/2005 | Riefe et al. ................. 280/777 |
| 2005/0035585 | A1 * | 2/2005 | Lee ............................ 280/779 |
| 2005/0103151 | A1 * | 5/2005 | Yoon .......................... 74/512 |

FOREIGN PATENT DOCUMENTS

| DE | 19952365 A1 | 3/2001 |
| DE | 20103248 U1 | 5/2001 |
| EP | 1234730 A2  | 8/2002 |
| GB | 2389565 A   | 12/2003 |
| JP | 2003-054390 | 2/2003 |

OTHER PUBLICATIONS

European Search Report for EP 06016157.7 issued Apr. 7, 2008.

* cited by examiner

*Primary Examiner*—Richard W L Ridley
*Assistant Examiner*—Terence Boes
(74) *Attorney, Agent, or Firm*—Studebaker & Brackett PC; Donald R. Studebaker

(57) ABSTRACT

Road wheels of a vehicle are provided with a steering shaft for transmitting a steering force from a steering wheel. An electric power steering unit (accessory) is disposed to a lateral side of the steering shaft. A clutch pedal is disposed below the electric power steering unit and pivotally mounted to a dash panel. The electric power steering unit is provided with an anti-intrusion bracket extending to the vicinity of the rear of the clutch pedal so that the anti-intrusion bracket can abut on the clutch pedal pushed rearward in a collision.

10 Claims, 5 Drawing Sheets

ANTI-INTRUSION PEDAL SYSTEM

CROSS-REFERENCES TO RELATED APPLICATIONS

This application claims priority under 35 USC 119 to Japanese Patent Application No. 2005-278431 filed on Sep. 26, 2005, the entire contents of which are incorporated herein by reference.

BACKGROUND OF THE INVENTION (a) Field of the Invention

This invention relates to anti-intrusion pedal systems for preventing a pedal from being moved rearward in a vehicle collision.

(b) Description of the Related Art

As disclosed, for example, in Japanese Patent Laid-Open Publication (Kokai) No. 2003-54390, there is conventionally known an anti-intrusion pedal system in which a parking brake pedal is fixed at its front part to a dash panel and is connected at its upper part through a connecting member to an instrument panel member located to the rear of the dash panel and extending in the car width direction and a guide member for abutting on the connecting member upon rearward movement of the dash panel due to a vehicle collision to guide it is disposed on a floor brace standing from a cabin floor to the instrument panel member. According to such an anti-intrusion pedal system, when the dash panel moves rearward, the guide member allows the parking brake pedal to move towards avoiding the driver.

In the above known anti-intrusion pedal system, however, it is necessary that the car body members including the instrument panel member and the floor brace connected to the instrument panel member exist in the vicinity of the pedal. Therefore, in order that the above anti-intrusion pedal system is applied to car body structures in which car body members do not exist in the vicinity of the pedal, the guide member must be disposed through an additional bracket or must be upsized, which arises problems of increasing the mass and needing an additional space.

SUMMARY OF THE INVENTION

The present invention has been made with the foregoing in mind and, therefore, its object is to reliably restrain rearward movement of the pedal while ensuring the layout flexibility around the steering wheel and restraining the increase in mass.

To attain the above object, in the present invention, an anti-intrusion bracket for preventing the pedal from being moved rearward in a vehicle collision is disposed on an accessory disposed to a lateral side of the steering shaft Specifically, a first aspect of the invention is directed to an anti-intrusion pedal system for preventing a pedal from being moved rearward in a vehicle collision. The anti-intrusion pedal system comprises: a steering shaft for transmitting a steering force from a steering wheel to road wheels of the vehicle; an accessory disposed to a lateral side of the steering shaft; said pedal disposed below the accessory and pivotally mounted to a dash panel; and an anti-intrusion bracket that extends to the vicinity of the rear of the pedal and, in a vehicle collision, abuts on the pedal pushed rearward to prevent further rearward movement of the pedal, and the anti-intrusion bracket is mounted on the accessory.

According to the above configuration, since the anti-intrusion bracket is provided on the accessory disposed to a lateral side of the steering shaft, the pedal disposed below the accessory abuts on the anti-intrusion bracket while pushed to move rearward in a vehicle collision. Therefore, even with the car body structure in which any car body structural member such as a floor brace does not exist in the vicinity of the pedal, the pedal can be prevented from being moved rearward in a vehicle collision without the need to dispose the anti-intrusion bracket through an additional bracket or upsize the anti-intrusion bracket itself.

In a second aspect of the invention, the anti-intrusion bracket is formed to extend from the accessory downward and towards the front of the vehicle.

According to the above configuration, even with the car body structure in which any car body structural member such as a floor brace does not exist in the vicinity of the pedal, the pedal can be prevented from being moved rearward in a vehicle collision without the need to dispose the anti-intrusion bracket through an additional bracket or upsize the anti-intrusion bracket itself while the space below the accessory around the steering shaft can be effectively used.

In a third aspect of the invention, the accessory comprises an electric power steering unit for assisting a steering force from the steering wheel.

It is desirable in view of space saving and mass reduction that the electric power steering unit be placed in the vicinity of the steering shaft to be driven by the electric power steering unit. With the above configuration, since the anti-intrusion bracket is mounted on the electric power steering unit, this reliably prevents rearward movement of the pedal while ensuring the layout flexibility and restraining the increase in mass.

In a fourth aspect of the invention, the electric power steering unit includes a planetary gear set mounted on the steering shaft and an electric motor for driving a gear of the planetary gear set, and the anti-intrusion bracket is mounted on the electric motor.

With the above configuration, since the anti-intrusion bracket is mounted on the electric motor with a high rigidity, the load due to rearward movement of the pedal can be reliably born and the rearward movement can be prevented.

In a fifth aspect of the invention, the mounting position of the anti-intrusion bracket on the electric power steering unit is located away from the pedal and close to the steering shaft.

With the above configuration, because the anti-intrusion bracket increases its rigidity as it is located closer to the steering shaft with a high rigidity, rearward movement of the pedal can be reliably restrained.

In a sixth aspect of the invention, the anti-intrusion bracket comprises a mounting part extending substantially vertically downward from the mounting position on the electric power steering unit and an abutment part extending at an angle from an end of the mounting part away from the mounting position downward and towards the front of the vehicle when viewed from a lateral side thereof and extending in a vehicle width direction and away from the steering shaft when viewed from the front thereof, and the abutment part is placed across the pedal when viewed from the front thereof.

With the above configuration, since the abutment part is disposed to extend from the end of the mounting part of the anti-intrusion bracket disposed close to the steering shaft in a direction away from the steering shaft when viewed from the front thereof, this ensures that the pedal pushed to move rearward abuts on the abutment part, thereby preventing its further rearward movement.

A seventh aspect of the invention is directed to an anti-intrusion pedal system for preventing a pedal from being moved rearward in a vehicle collision. The anti-intrusion pedal system comprises: a steering shaft for transmitting a steering force from a steering wheel to road wheels of the vehicle; an electric power steering unit, disposed to a lateral side of the steering shaft, for assisting the steering force from the steering wheel; said pedal disposed below the electric power steering unit and pivotally mounted to a dash panel; and an anti-intrusion bracket that extends to the vicinity of the rear of the pedal and, in a vehicle collision, abuts on the pedal pushed rearward to prevent further rearward movement of the pedal. Further, the anti-intrusion bracket is mounted on the electric power steering unit and formed to extend from the electric power steering unit downward and towards the front of the vehicle.

An eighth aspect of the invention is directed to an anti-intrusion pedal system for preventing a pedal from being moved rearward in a vehicle collision. The anti-intrusion pedal system comprises: a steering shaft for transmitting a steering force from a steering wheel to road wheels of the vehicle; an electric power steering unit for assisting the steering force from the steering wheel, the electric power steering unit including a planetary gear set mounted on the steering shaft and an electric motor for driving a gear of the planetary gear set; said pedal disposed below the electric power steering unit and pivotally mounted to a dash panel; and an anti-intrusion bracket that extends to the vicinity of the rear of the pedal and, in a vehicle collision, abuts on the pedal pushed rearward to prevent further rearward movement of the pedal. Further, the anti-intrusion bracket is mounted on the electric power steering unit and the mounting position of the anti-intrusion bracket on the electric power steering unit is located away from the pedal and close to the steering shaft.

DETAILED DESCRIPTION OF THE INVENTION

Embodiments of the present invention will be described below with reference to the drawings.

Figure 1:
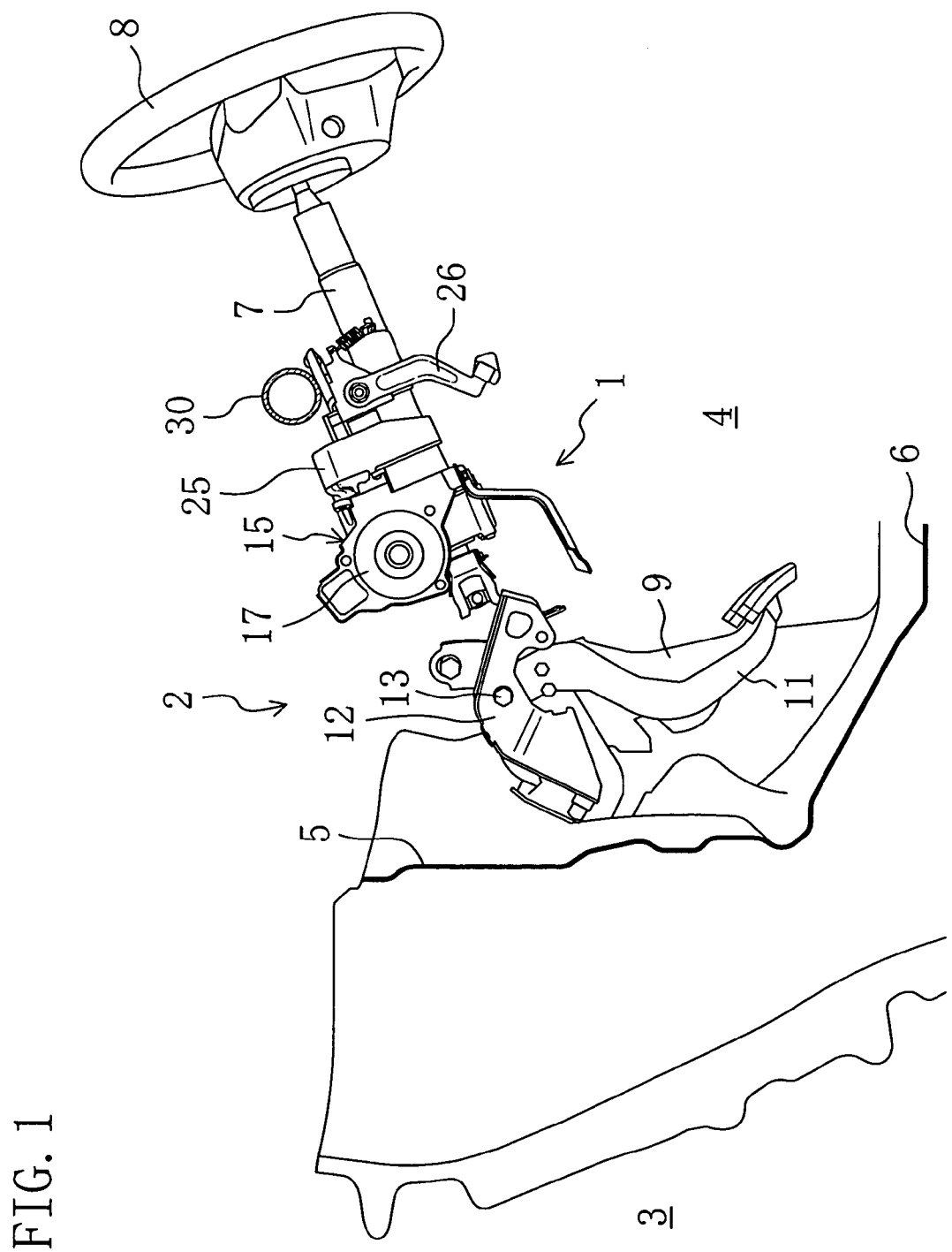
FIG. 1 is a side cross-sectional view of a front part of a car body with an anti-intrusion pedal system according to an embodiment of the present invention.
Figure 2:
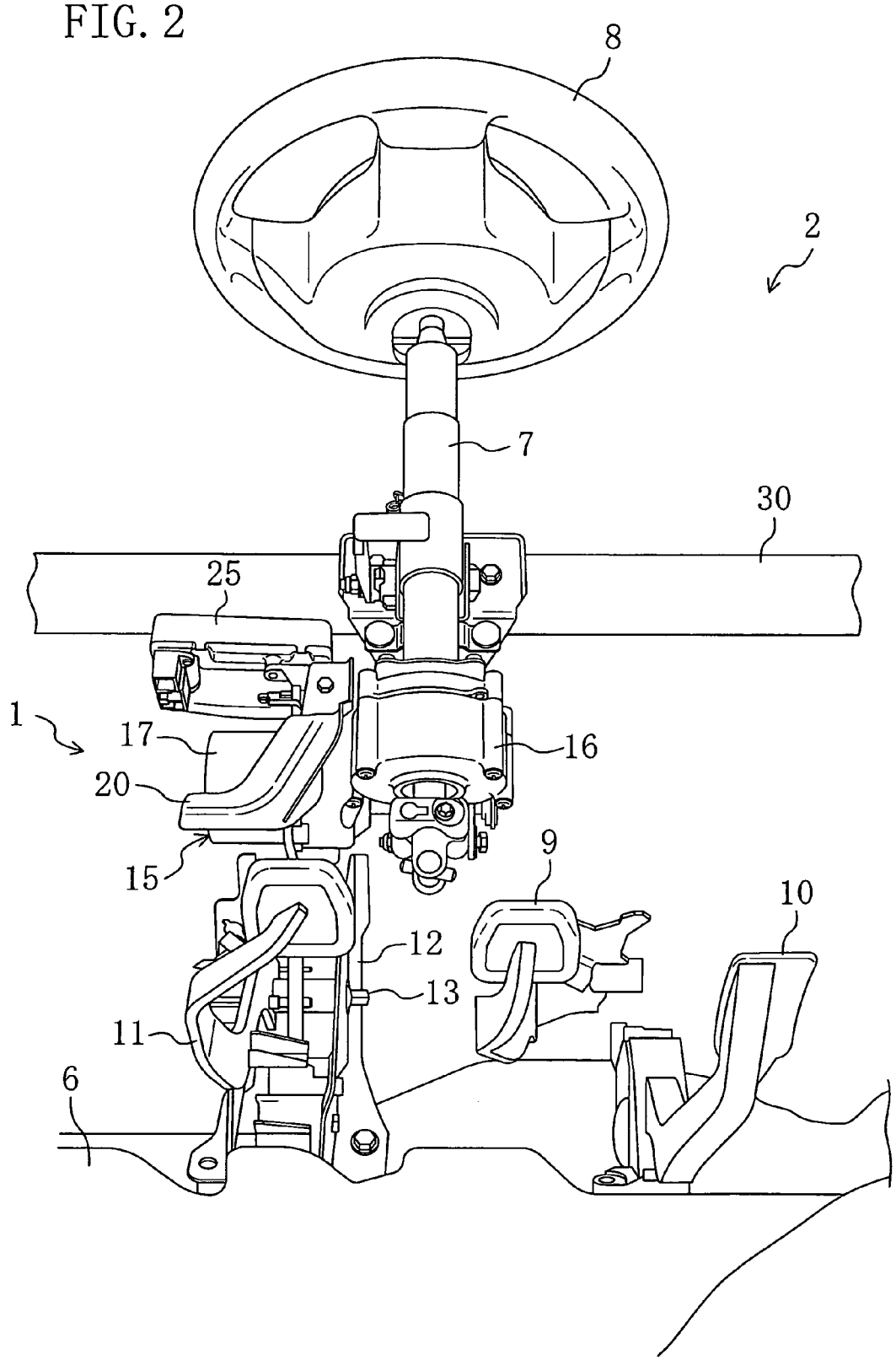
FIG. 2 is a perspective view of the front part of the car body with the anti-intrusion pedal system as viewed from below and the rear.

FIG. 1 shows a front part 2 of a driver's seat with an anti-intrusion pedal system 1 according to an embodiment of the present invention. FIG. 2 shows the driver's seat front part 2 as viewed from below and the rear. For simplicity, a dash panel 5 is not given in FIG. 2.

Figure 4:
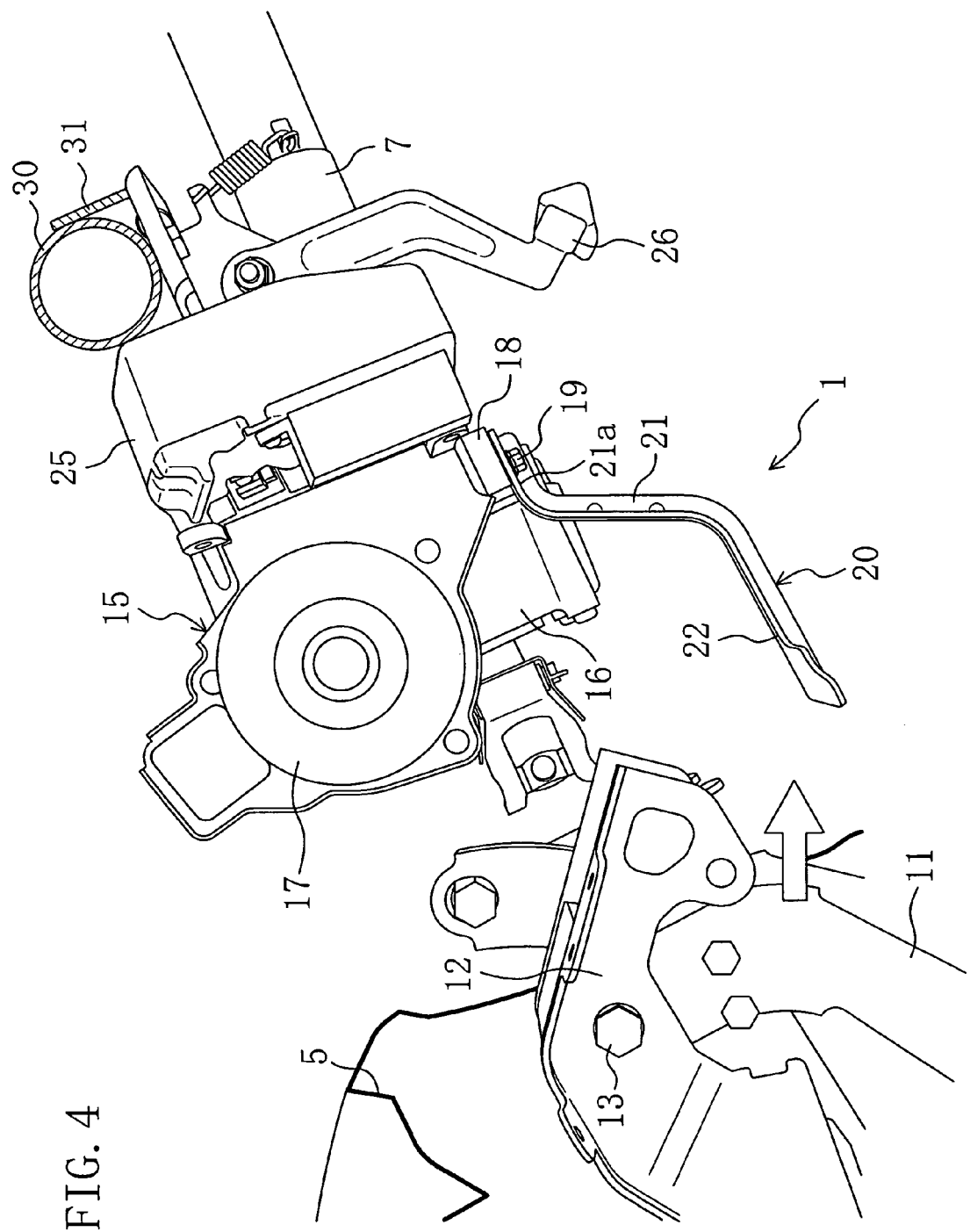
FIG. 4 is an enlarged side view of the anti-intrusion pedal system and the surroundings as viewed from the left side.

In the driver's seat front part 2, a steering shaft 7 extends at an angle rearward and upward from between a floor panel 6 and the dash panel 5 partitioning an engine room 3 and a cabin 4 (but, for simplicity, a lower part of the steering shaft 7 passing through the floor panel 6 is not given in the figures). The steering shaft 7 acts to transmit a steering force from the steering wheel 8 to road wheels (not shown) of the car. Further, the driver's seat front part 2 is provided with an instrument panel member 30 extending in the car width direction. The instrument panel member 30 is connected to an A frame (not shown) of the car body. The steering shaft 7 is connected through a connecting bracket 31 (shown only in FIG. 4) to the instrument panel member 30 and thereby firmly supported to the car body.

Figure 3:
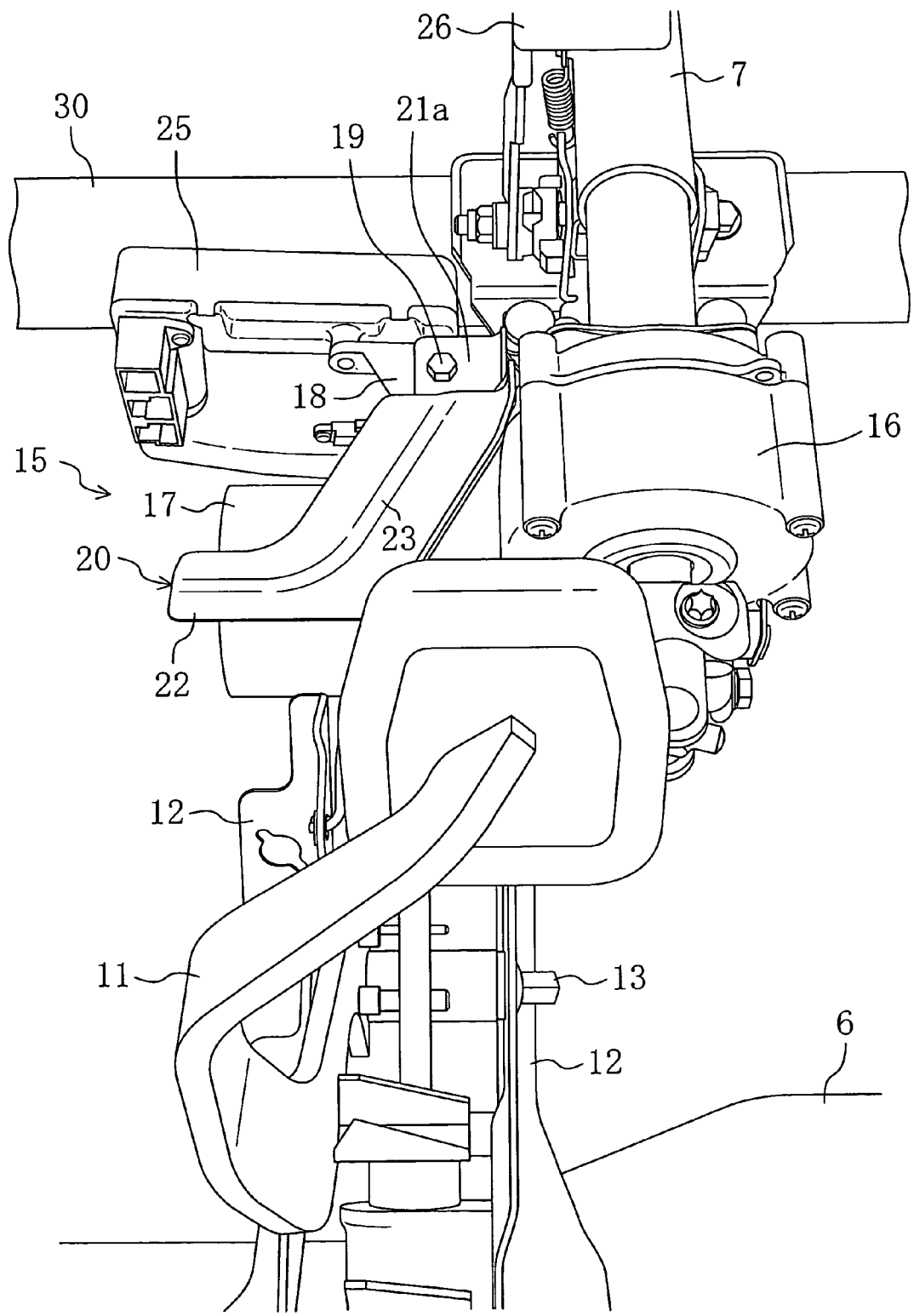
FIG. 3 is an enlarged perspective view of the anti-intrusion pedal system and the surroundings as viewed from below and the rear.

To the right of the steering shaft 7, a brake pedal 9 is pivotally mounted to the dash panel 5. To the right of the brake pedal 9, an accelerator pedal 10 is pivotally mounted to the dash panel 5. To the left of the steering shaft 7, a clutch pedal 11 is pivotally mounted through a connecting member 12 to the dash panel 5. Specifically, as shown in an enlarged manner in FIGS. 3 and 4, the clutch pedal 11 is mounted for frontward and rearward swing movement about a pedal pivot 13 attached to the connecting member 12.

Further mounted to the left of the steering shaft 7 is an electric power steering unit 15, as an accessory, for assisting a steering force from the steering wheel 8. The electric power steering unit 15 includes a planetary gear set 16 disposed on the steering shaft 7 and an electric motor 17 for driving a gear (not shown) of the planetary gear set 16. The clutch pedal 11 is located below the electric power steering unit 15.

An anti-intrusion bracket 20 is mounted on the electric motor 17. The anti-intrusion bracket 20 is formed to extend from the electric motor 17 downward and towards the car front.

Specifically, the anti-intrusion bracket 20 includes a mounting part 21 extending from its mounting position on the electric power steering unit 15 substantially vertically downward when viewed from a lateral side and an abutment part 22 extending at an angle from an end of the mounting part 21 away from the mounting position downward and towards the car front. The upper end of the mounting part 21 is formed into a flat part 21a inclined upward and slightly rearward. The flat part 21a is formed with a bolt insert hole (not shown). By inserting a bolt 19 in the bolt insert hole and fastening the anti-intrusion bracket 20 to a bracket mounting part 18 formed on the housing of the electric motor 17, the anti-intrusion bracket 20 is secured to the electric motor 17.

The abutment part 22 of the anti-intrusion bracket 20 extends, as viewed from the front, substantially horizontally in the direction away from the steering shaft 7 (towards the left in the car width direction). The mounting part 21 and the abutment part 22 are formed with a plurality of beads 23 for enhancing rigidity.

Figure 5:
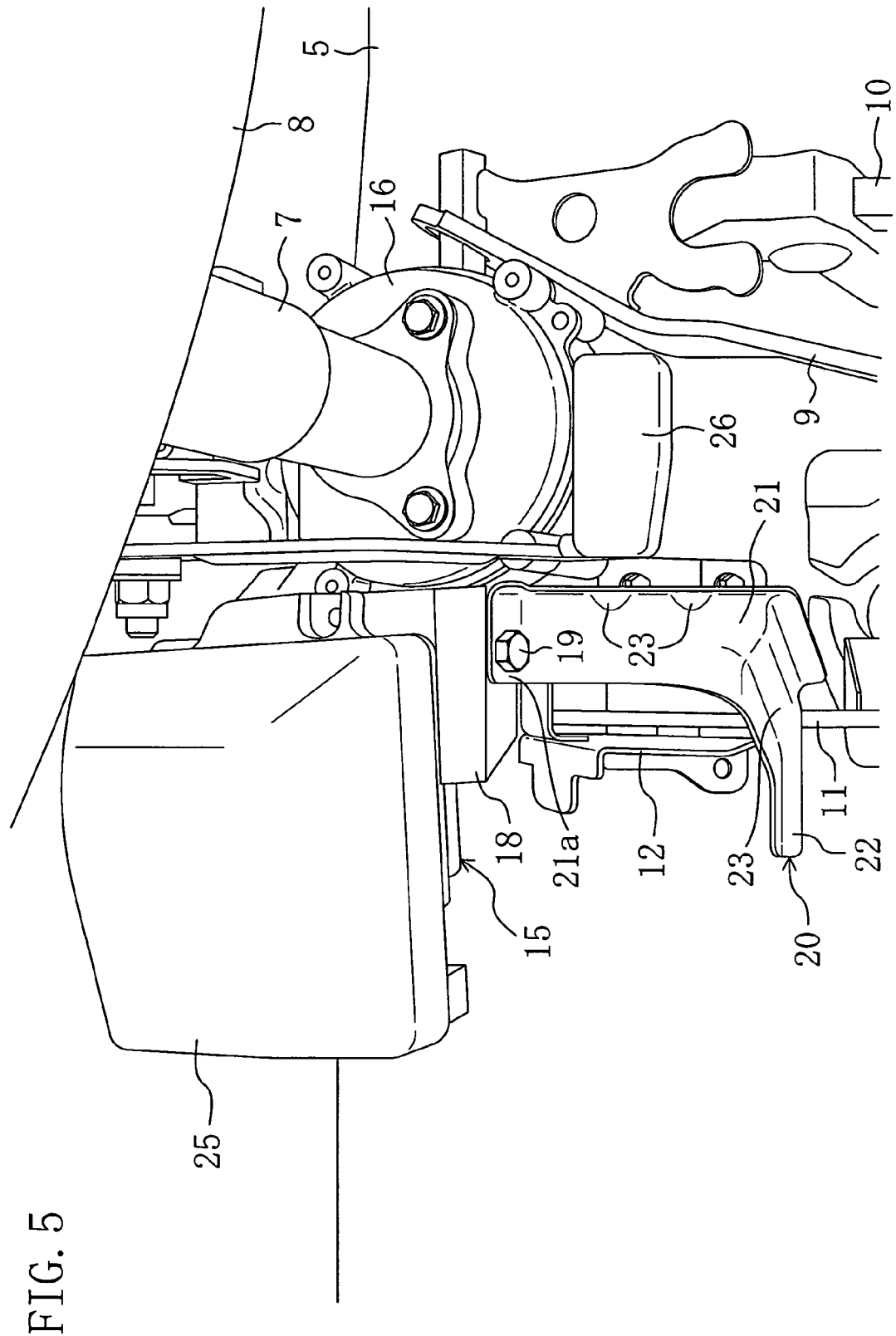
FIG. 5 is an enlarged perspective view of the anti-intrusion pedal system and the surroundings as viewed from above.

As shown in FIG. 5, the mounting position of the anti-intrusion bracket 20 on the electric power steering unit 15 is located not just above the clutch pedal 11 but close to the steering shaft 7. Since, however, the abutment part 22 extends substantially horizontally leftward, it is finally placed across the clutch pedal 11 when viewed from the front.

The above configuration acts to bring the anti-intrusion bracket 20 into abutment against the clutch pedal 11 having been pushed to move rearward in a collision and thereby prevent further rearward movement of the clutch pedal 11.

Provided above the electric motor section 17 is a controller 25 that constitutes part of the electric power steering unit 15 to control the electric motor 17. Provided above the controller 25 is a tilting lever 26 for adjusting the vertical position of the steering wheel 8.

—Behaviors—

Next, a description is given of behaviors of the anti-intrusion pedal system 1 according to the present embodiment.

First, when a vehicle collides head-on with an obstacle, the dash panel 5 is pushed to move rearward by a collision load. As the dash panel 5 moves rearward, as shown in the arrow in FIG. 4, the clutch pedal 11 pivotally mounted to the dash panel 5 also moves rearward together with the connecting member 12.

Subsequently, a portion of the clutch pedal 11 lower than the pedal pivot 13 abuts on the abutment part 22 of the anti-intrusion bracket 20.

Then, when the dash panel 5 further moves rearward, the clutch pedal 11 borne by the anti-intrusion bracket 20 swings frontward about the pedal pivot 13. Thus, the clutch pedal 11 is prevented from being moved rearward. This avoids that the clutch pedal 11 abuts on driver's legs.

—Effects of Embodiment—

According to the anti-intrusion pedal system 1 of the present embodiment, when the clutch pedal 11 disposed below the electric power steering unit 15 is pushed to move rearward in a vehicle collision, the anti-intrusion bracket 20 mounted on the electric motor 17 of the high-rigidity electric power steering unit 15 abuts on the clutch pedal 11 moving rearward and prevents further rearward movement of the clutch pedal 11. Therefore, even with the car body structure in which any car body structural member such as a floor brace does not exist in the vicinity of the clutch pedal 11, the rearward movement of the clutch pedal 11 can be reliably restrained with the minimization of the increase in mass and the layout flexibility around the steering wheel 8 can be ensured.

Other Embodiments

The above embodiment of the present invention may be modified into the following forms.

Though in the above embodiment the electric power steering unit 15 is used as the accessory, the accessory is not limited to this. For example, the accessory may be a variable gear ratio (VGR) steering unit in which the steering wheel 8 has a normal gear ratio in and around the center and has quick gear ratios at large steering angles and the anti-intrusion bracket 20 may be mounted on an electric motor in the VGR steering unit. The VGR steering unit provides a feel of high security during high-speed travel and a sharp turning feel during low-speed travel with the steering wheel turned at large angles and during parking.

Though in the above embodiment the clutch pedal 11 is used as the pedal intended for the anti-intrusion pedal system 1, other kinds of pedals, such as a parking brake pedal, may be applied to the anti-intrusion pedal system 1 so long as they are disposed below the accessory and pivotally mounted to the dash panel 5.

The above embodiments are preferable embodiments merely illustrative in nature and are not intended to limit the scope, applications and use of the invention.

What is claimed is:

1. An anti-intrusion pedal system for preventing a pedal from being moved rearward in a vehicle collision, said system comprising:
   a steering shaft for transmitting a steering force from a steering wheel to road wheels of the vehicle, where the steering shaft is supported by a connecting bracket and the connecting bracket is fixed to an instrument panel member extending in a car width direction;
   an electric power steering unit assisting a steering force and fixed to a position between the connecting bracket and the pedal in a pivot direction of the steering shaft;
   a gear set engaged with the steering shaft in the electric power steering unit;
   an electric motor provided in the electric power steering unit, fixed to a side of the gear set, the side of which is located on a side of the pedal in the car width direction, and arranged between the connecting bracket and the pedal when viewed from a lateral side;
   the pedal disposed below the connecting bracket and pivotally mounted to a dash panel;
   an anti-intrusion bracket that extends towards the rear of the pedal so as to abut the pedal pushed rearward to prevent further rearward movement of the pedal in a vehicle collision; and
   said anti-intrusion bracket being mounted on the electric motor.

2. The anti-intrusion pedal system of claim 1, wherein the anti-intrusion bracket is formed to extend from the accessory downward and towards the front of the vehicle.

3. The anti-intrusion pedal system of claim 1, wherein
   the gear set includes a planetary gear set mounted on the steering shaft and an electric motor for driving a gear of the planetary gear set.

4. The anti-intrusion pedal system of claim 1, wherein the mounting position of the anti-intrusion bracket on the electric motor is spaced from the pedal and closer to the steering shaft in the car width direction.

5. The anti-intrusion pedal system of claim 4, wherein
   the anti-intrusion bracket comprises a mounting part extending substantially vertically downward from the mounting position on the electric motor and an abutment part extending at an angle from an end of the mounting part away from the mounting position downward and towards the front of the vehicle when viewed from a lateral side thereof and extending in a vehicle width direction and away from the steering shaft when viewed from the front thereof, and
   the abutment part is placed across the pedal when viewed from the front thereof.

6. The anti-intrusion pedal system of claim 1, wherein
   the anti-intrusion bracket is formed to extend from the electric motor downward and towards the front of the vehicle.

7. The anti-intrusion pedal system of claim 1, wherein
   the gear set includes a planetary gear set mounted on the steering shaft and the electric motor for driving a gear of the planetary gear set; and
   the mounting position of the anti-intrusion bracket on the electric motor is spaced from the pedal and closer to the steering shaft in the car width direction.

8. The anti-intrusion pedal system of claim 1, wherein
   an electric power steering unit has a variable gear ratio for adjusting speed reduction ratio.

9. The anti-intrusion pedal system of claim 1, wherein
   a tilting lever for adjusting the vertical position of the steering shaft is arranged between the steering shaft having the electric power steering unit and the connecting bracket, and
   the electric power steering unit is disposed in front of the connecting bracket and is separated from the connecting bracket.

10. An anti-intrusion pedal system for preventing a pedal from being moved rearward in a vehicle collision, said system comprising:
   a steering shaft for transmitting a steering force from a steering wheel to road wheels of the vehicle, the steering shaft being supported by a connecting bracket and the connecting bracket is fixed to an instrument panel member extending in a car width direction;

the pedal disposed below the connecting bracket and pivotally mounted to a dash panel;

an electric power steering unit assisting a steering force and fixed to a position between the connecting bracket and the pedal in a pivot direction of the steering shaft;

a gear set engaged with the steering shaft in the electric power steering unit;

an electric motor provided in the electric power steering unit, connected to a side of the gear set, the side of which is located on a side of the pedal in the car width direction, extending toward the car width direction on the side of the pedal and arranged between the connecting bracket and the pedal when viewed from a lateral side;

an anti-intrusion bracket that extends towards the rear of the pedal so as to abut the pedal pushed rearward to prevent further rearward movement of the pedal in a vehicle collision; and the anti-intrusion bracket being mounted on a bracket mounting part, wherein the bracket mounting part is formed on a side of the pedal in the car width direction nearer than the steering shaft in a casing of the electric power steering unit, and in a position lower than the connecting bracket in the vertical direction.

* * * * *